Aug. 4, 1964   A. J. JOHNSTON   3,142,881
HOSE CLAMP
Filed June 6, 1962
FIG. 2
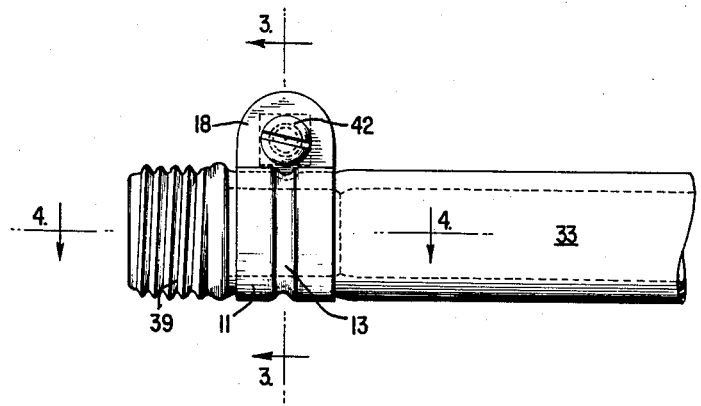
FIG. 4
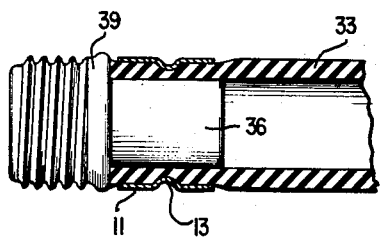
FIG. 3
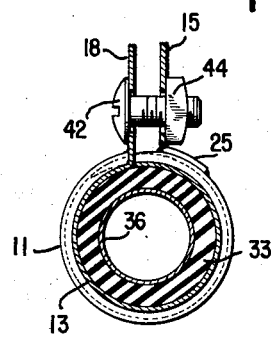
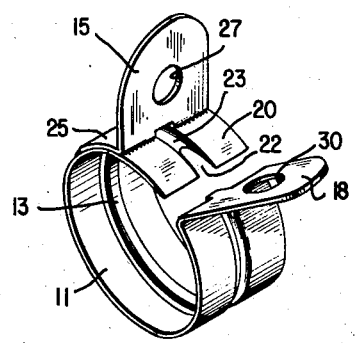
FIG. 1
INVENTOR.
ALVA J. JOHNSTON
BY
ATTORNEYS

United States Patent Office 3,142,881
Patented Aug. 4, 1964

3,142,881
HOSE CLAMP
Alva J. Johnston, P.O. Box 1369, Cut Bank, Mont.
Filed June 6, 1962, Ser. No. 200,381
1 Claim. (Cl. 24—279)

This invention is a novel clamp for hoses. The clamp is particularly of use where resilient hoses designed to carry pressurized fluids need to be connected to other hose sections, to nozzle or other fittings, and the like.

A great many types of hose clamps are known to the art and many different varieties offering one or another advantage are commercially available. Despite this fact, it is not known that any hose clamp has been developed prior to my invention which combines both ease of assembly, positive holding of connecting members in place and resistance to substantial hose pressures, for instance greater than about 30 p.s.i.g., e.g. 100 p.s.i.g.

For example, a persistent difficulty in the dispensing of pressurized beverages, for example, tap beer, is the unavailability of a clamp for the outside of the hose which will withstand high pressures without requiring a specially corrugated male connecting member inside the hose. Spigots for dispensing tap beer generally provide a smooth male connection for insertion into the hose leading from the keg. Although the hose ordinarily is resilient to some extent, the resilience is usually curtailed by the two- or three-ply nature of hoses suitable for withstanding the pressures involved in beer dispensing. For ease of changing hoses on the spigot, therefore, the male connection usually has a smooth surface which will slide easily into the hose without requiring the struggle associated with a corrugated male member. However, the usual practice has been to secure the hose to the male member and insure a positive seal by wrapping copper wire around the outside of the hose at the connection. This, of course, is a time-consuming task and it is insufficient in that it will eventually allow air to leak.

The hose clamp of this invention serves to secure the hose to a male connection and provide a positive seal in a manner sufficient to withstand high pressures substantially indefinitely. The effectiveness of this clamp is due at least in part to its simplified construction.

The novel hose clamp of this invention comprises an essentially circular strap adapted to completely encircle the hose to be connected, the strap being provided with a circumferential projection on the inside of the strap which also preferably will completely encircle the hose. The projection is preferably at the midsection of the strap and the strap generally is provided with ears suitably spaced to allow tightening of the strap.

The invention will be better understood by reference to the accompanying drawing which is to be considered illustrative only and not limiting.

FIGURE 1 is a perspective view of the hose clamp of the invention in a stretched-open position.

FIGURE 2 is a perspective view of a portion of hose fastened to a male connection by the use of the novel clamp.

FIGURE 3 is a vertical cross-sectional view of the hose, clamp and connector taken along the line 3—3 of FIGURE 2 and FIGURE 4 is a partial horizontal cross-section along the line 4—4 of FIGURE 2.

As shown, the hose clamp comprises the circular strap 11 provided with the inward projection 13 and the outside ears such as 15 and 18. The amount of inward extension of the projection may frequently vary, being dependent somewhat on the resilience and breaking strength of the hose to be clamped. It will be noted that the ear 15 is positioned on the strap a short distance from one end of the strap to provide the extending portion 20. The provision of this extending portion, which preferably is tapered as shown in FIGURES 1 and 3, allows the strap to completely encircle the hose in its relaxed position, before tightening is begun by drawing the ears together. This extending portion 20 generally will be provided with the notch 22 and the groove 23 in the upper surface of the portion 20 to allow the extending portion 20 to clear the part of projection 13 near the ear 18, this serving to guide the two ends together, provide essentially equal pressure around the hose, and ensure a fluid-tight relationship between the strap and member 36.

The ears 15 and 18 may be made integral with the strap or may be fastened to the strap, for example, by welding, the welded joint being sufficient to withstand the stresses and strains to which the clamp is put in use. In the drawings, ear 18 is shown as an integral extension of the strap while ear 15 is welded to the strap by means of the foot portion 25. Also, as shown, the ears 15 and 18 are provided with holes 27 and 30 respectively for reception of a bolt. Provision for drawing the ears together may be made by means other than a bolt; for example the holes 27 and 30 may be threaded internally for reception of a stud. The projection 13 may be a separate member fastened to the inside of the strap 11, but preferably it is integral with the strap, having been formed advantageously by corrugation of the outside of the strap.

The novel hose clamp of this invention may be used in any situation where a resilient hose, for instance plastic, rubber or fabric hose, is to be held in firm and close contact with an internal fitting. For example, FIGURES 2–4 show the clamp used to fasten a hose 33 to the male connection 36 of a male screw coupling. Although this male connection 36 may be corrugated or otherwise provided with means for secure attachment to the inside of the hose, the male connection often will be a smooth connection as shown in the drawings.

The assembly of a hose connection using the novel clamp of this invention will be readily apparent to one of ordinary skill in the art from the drawings. A clamp of suitable size is placed around the end of a hose to completely encircle the hose. A male connection, preferably one having an outside diameter just equal to the inside diameter of the hose is placed inside the end of the hose. A bolt 42 is placed through the holes 27 and 30 in the ears 15 and 18 and a nut 44 is screwed onto the bolt. The tightening of the nut 44 serves to draw ears 15 and 18 closer together and causes projection 13 to "bite" relatively uniformly into and continuously around the hose 33 causing a positive and firm seal between the hose 33 and the male connecting member 36. During this tightening the projection 13 near the ear 18 is guided into and kept in position by the notch 22 and groove 23. It will be noted that both the strap portion 11 and the projection 13 form complete circles around the hose and therefore a complete seal with no gaps or pinches or weakened connecting portions. By providing just one projection on the inside of the strap portion, the novel clamp of this invention avoids some undesired effects experienced with clamps having multiple projections. For example, where a double projection is employed, the hose portion between the two projections may bulge, leaving a dead space between the hose and the strap which would make the whole connection subject to leakage under high pressure. With the single projection employed preferably in this invention, however, there is a single movement of forces away from the innermost portion of the projection giving a positive seal along the entire extension of the projection and the strap.

Thus the novel hose clamp of this invention gives not only a good clamping effect to hold the male connection in place inside the hose, but also gives a good sealing effect which has been sufficient to withstand pressures up to about 100 pounds for long periods of time.

It is claimed:

A clamp suitable for use with a hose of curtailed resilience having a smooth connection inserted therein, capable of completely encircling said hose in both relaxed and tightened positions and capable of biting relatively uniformly and continuously around the hose to cause a positive and firm seal, without pinching, comprising a sheet metal strap including a circular portion capable of having a relaxed position and a tightened position and an outwardly bent ear portion at one end of said circular portion, said strap being corrugated to provide a continuous circular internal projection and an external groove of about the same depth as said internal projection, a second ear provided with a foot portion for attachment to the strap, positioned a short distance from the end of said circular portion opposite said first ear, said short distance providing a circularly extending portion, the free end of said extending portion and the projection of said extending portion being tapered along the inwardly facing side to provide an open notch aligned with the projection at said other end of the circular portion, said notch being coordinated in size with said internal projection and with said external groove, to allow the said extending portion to fit the underside of said other end of the circular portion, said projection at the said other end of the circular portion in the tightened position fitting within said notch and said groove.

References Cited in the file of this patent

UNITED STATES PATENTS

| | | |
|---|---|---|
| 549,352 | Folger | Nov. 5, 1895 |
| 576,119 | Hess | Feb. 2, 1897 |
| 592,647 | Davis | Oct. 26, 1897 |
| 1,255,417 | Hedges | Feb. 5, 1918 |
| 1,497,549 | Conradi | June 10, 1924 |

FOREIGN PATENTS

| | | |
|---|---|---|
| 20,806 | Great Britain | of 1906 |